No. 771,468. PATENTED OCT. 4, 1904.
L. FALK.
AIR COOLED ELECTRIC MACHINE.
APPLICATION FILED NOV. 18, 1903.
NO MODEL. 2 SHEETS—SHEET 1.

WITNESSES: INVENTOR
Julius H. Lutz Leo Falk
John Lotka BY
Briesen & Knauth
ATTORNEYS

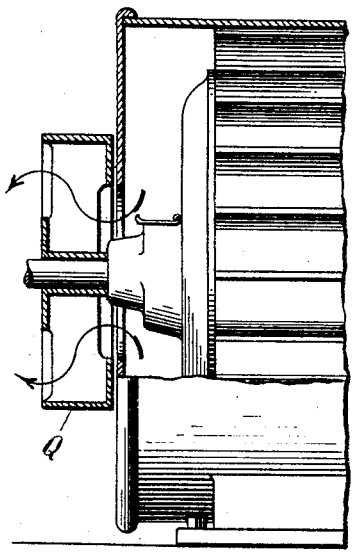
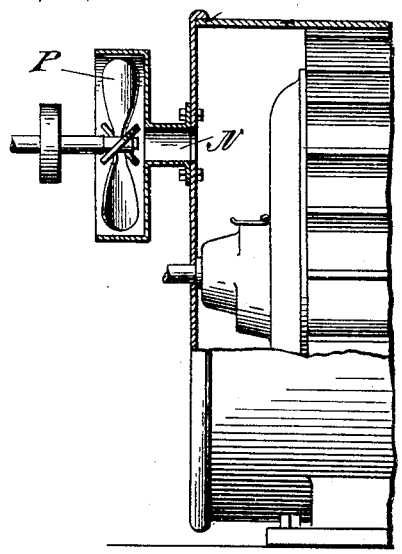
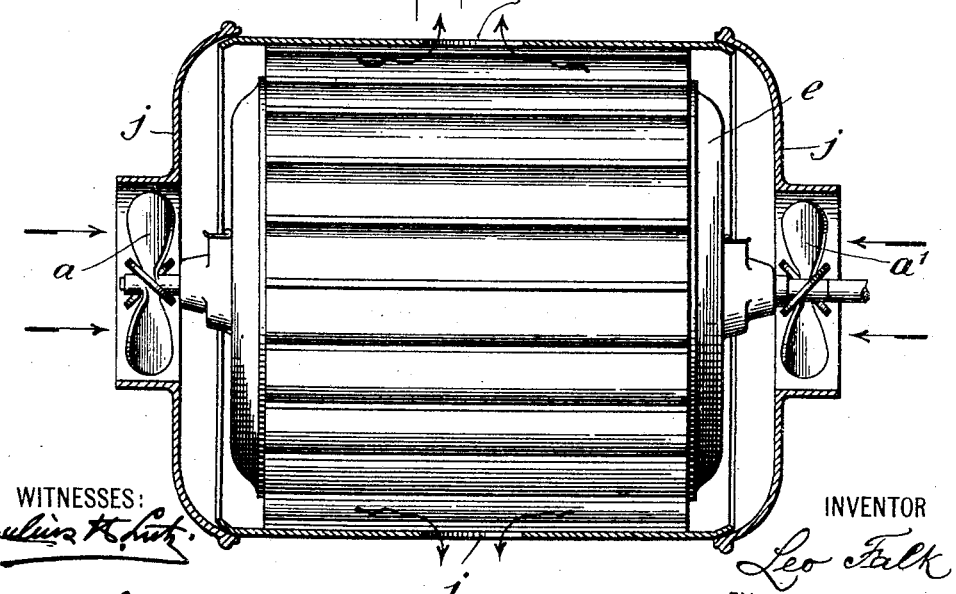

No. 771,468.

Patented October 4, 1904.

UNITED STATES PATENT OFFICE.

LEO FALK, OF BADEN, SWITZERLAND.

AIR-COOLED ELECTRIC MACHINE.

SPECIFICATION forming part of Letters Patent No. 771,468, dated October 4, 1904.

Application filed November 18, 1903. Serial No. 181,588. (No model.)

*To all whom it may concern:*

Be it known that I, LEO FALK, a subject of the Emperor of Germany, residing in Baden, Switzerland, have invented certain new and useful Improvements in Air-Cooled Electric Machines, of which the following is a specification.

My present invention relates to devices for conveying generated heat from wholly or partially inclosed mechanism, and particularly relates to means for conveying away heat generated in wholly or partially inclosed electric dynamos and motors.

This invention consists, primarily, in an improved structure for providing a large radiating-surface upon the motor-inclosing casing in the form of an air channel or channels and also for providing a circulation of air in contact with said radiating-surface.

The invention further consists in providing novel means for conveying the heat from the parts where it is generated to the members containing the radiating-surface, in driving the conveying means from the working parts of the motor, and other features of novelty hereinafter set forth, and particularly pointed out in the appended claims.

I have illustrated in the accompanying drawings several forms in which my invention may be embodied.

Figure 1:
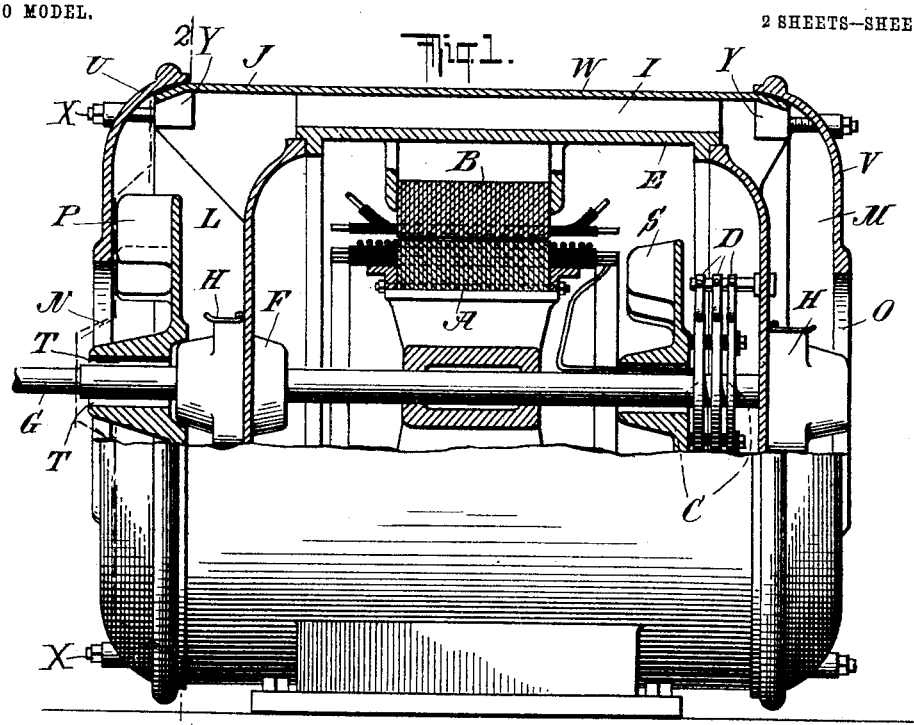
Figure 2:
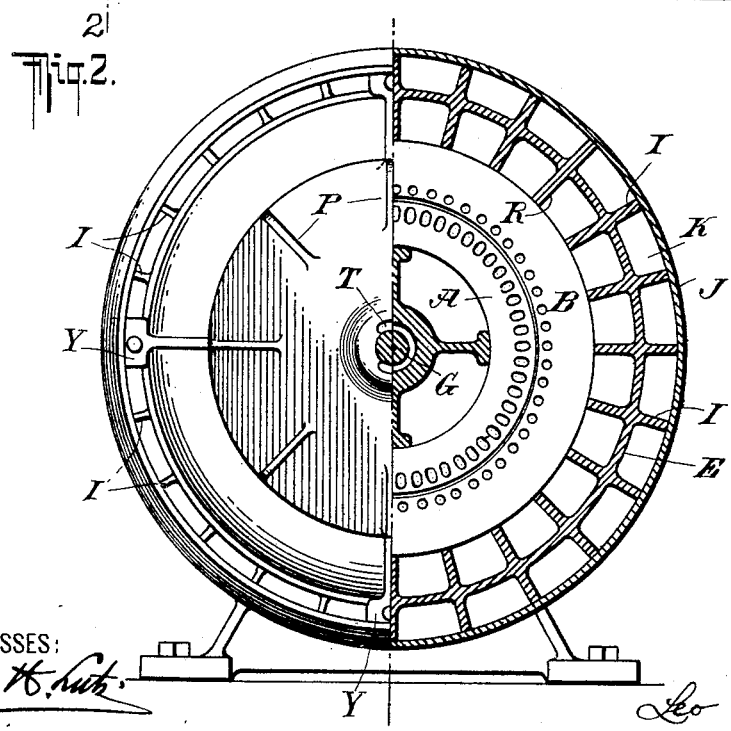

In the drawings, Figure 1 is a side elevation of an electric motor and casing embodying my invention and showing the casing partially broken away. Fig. 2 is a cross-section on line 2 2 of Fig. 1, showing a portion of the motor-casing broken away. Fig. 3 is a detail in elevation, partly broken away, of another form embodying my invention. Fig. 4 is a similar view of a third form in which my invention is embodied, and Fig. 5 shows still another form of my invention.

The fields, armature, commutator, brushes, and like parts of the electric motors and other electric machines are often required to be entirely or partially inclosed within a housing to protect them from dust and dirt and protect those about such machine. This is especially the case where grinding or buffing is being done. This housing prevents to a great extent radiation of heat generated within the working parts, and the motor heats up very easily.

My invention contemplates the placing of a current of air in contact with the housing of the motor and is carried out by means of an auxiliary casing and current-producing mechanisms, hereinafter set forth, together with other detail construction hereinafter described, and particularly pointed out in the appended claims.

Referring to the drawings, the armature A, fields B, collector C, brushes D, &c., are inclosed within a casing E. The casing E entirely incloses these working parts in a practically hermetic fashion and is provided with bearings F for the motor-shaft G, which bearings F are provided with oil-boxes H at the outside of said casing E.

I provide ribs I upon the outer surface of the casing E to increase the radiating-surface of said casing E, and I also provide an outer casing J, somewhat larger than the inner casing E, which outer casing J engages the ribs I upon the inner casing E, forming longitudinal channels K between the two casings. This construction produces a much greater radiating-surface upon the inner casing E, while at the same time it provides inclosed channels running longitudinally between the two casings. The ends of the casing E are left free of ribs at their central portions, forming chambers L and M. In the form of casing shown in Figs. 1 and 2 the outer casing J is provided at the ends with apertures N and O concentric with the shaft G. Just within the aperture N, I place a fan P or other rotary air-engine to rotate therewith.

When the motor is running, the fan P draws air in through the aperture N into the chamber L, from which chamber L the air is driven through the channels K into the chamber M, from whence it passes out through the aperture O in the casing J. It will be seen that by this method a current of cool air is caused to entirely inclose the casing E, and as the heat from the casing E travels through the heat-conducting material of the ribs I and the outer casing J an extremely large radiating-surface is presented to the current of air in a very compact structure.

I may place the fan P or other air-engine eccentric to the shaft G, as shown in the form Fig. 4, and may drive said fan from the shaft G or from an independent source of power. I may cause the fan P to compress the air within the casing in forcing it through, as contemplated in the foregoing description, or I may arrange said fan P to act as an exhaust and draw the air through the casing. I may also place the fan P without the casing J and may construct the pulley Q upon the shaft of the motor with vane-spokes to act as a fan, as shown in the form Fig. 3.

My invention further consists in providing the casing E with inwardly-projecting ribs R and placing upon the motor-shaft G within the casing E a fan or air-engine S, which upon the rotation of the motor-shaft G will draw the heated air from the working parts and throw it out against the inner surface of the casing E, the radiating-surface of which is augmented by the ribs R. The combination of the fan S within the casing with the circulating mechanism without the casing produces a very efficient device for eliminating the deleterious heating effects so commonly present in inclosed motors.

The oil-box H being located in the chamber L and the fan compressing air within said chamber L, the compressed air would be liable to force the oil from the oil-box H to the bearing into the interior of the casing E. To obviate this, I have provided channels T in the hub of the fan P, which communicate with the shaft-aperture in the oil-box H, so that any pressure upon the interior of the oil-box H will be allowed to escape through the channels without forcing the oil through the bearing.

I have shown the outer casing J constructed with two end pieces U and V, connected by a thin barrel W, machine screws or bolts X passing through the end pieces U and V and engaging lugs Y upon the barrel W. It is obvious that various changes may be made in the form, details of construction, and arrangement of devices embodying my invention without departing from the spirit of my invention.

In Fig. 5 I have shown two fans $a\ a'$ at the ends of the outer casing $j$ and inner casing $e$, while the outer casing has openings $j''$ at its center to allow the air to escape or be drawn in according to the action of the fans $a\ a'$.

What I claim as new, and desire to secure by Letters Patent, is—

1. The combination with an electric machine and a casing completely inclosing the same, of a second casing having an inlet and an outlet and completely inclosing the first-named casing at a distance therefrom, and a rotary air-circulator arranged to maintain a current of air in the space between said casings.

2. The combination with an electric machine, and a casing completely inclosing the same, of a barrel surrounding the peripheral portion of said casing at a distance therefrom, end pieces secured to said barrel at a distance from said casing to form inclosing chambers, a series of passage-ways between the barrel and the casing, and a rotary air-circulator arranged to maintain a current of air through said passage-ways and inclosing chambers.

3. The combination with an electric machine and a casing surrounding the same, of an inclosing chamber about said casing, and an air-circulator driven from the shaft of said electric machine to maintain a current of air through said chamber.

4. The combination with an electric machine and a casing surrounding the same, of another casing surrounding the first-named casing and forming a chamber therewith, and an air-circulator on the shaft of said electric machine to maintain a current of air through said chamber.

5. The combination with an electric machine and a casing surrounding the same, of a series of passage-ways inclosing said inclosing casing and an air-circulator driven from the shaft of said electric machine to maintain a current of air through said passage-ways.

6. The combination with an electric machine and a casing surrounding the same, of an inclosing chamber without said casing, and a rotary member on the shaft of said electric machine, the said member comprising an air-circulator arranged to maintain a current of air through said inclosing chamber.

7. The combination with an electric machine, and a casing completely inclosing the same and having ribs upon its outer surface, of a barrel surrounding the peripheral portion of said casing and engaging said ribs to form therewith a series of passage-ways surrounding said casing, end pieces secured to said barrel at a distance from said casing to form inclosing chambers, and a rotary air-circulator arranged to maintain a current of air through said passage-ways and said inclosing chambers.

8. The combination with an electric machine and a casing surrounding the same, of an oil-container upon the exterior of and communicating with the interior of said inclosing casing, an outer casing surrounding said inclosing casing and said oil-container, an air-circulator arranged to maintain a current of air between the two casings and a passage-way from the interior of said oil-container to the outer atmosphere to relieve pressure therein.

9. The combination with an electric machine and a closed casing surrounding the same and having ribs on its interior surface, of an air-circulator on the shaft of said electric machine within said inclosing casing arranged to maintain a circulation of air from the heating parts of said machine to and against said ribs, a second casing surrounding the first-named casing and forming a cooling-chamber therewith, and an air-circulator for maintaining a current of air through said chamber.

10. The combination with an electric machine and a closed casing surrounding it, of a series of ribs upon the interior of said casing and an air-circulator on the shaft of said electric machine arranged to maintain a circulation of air from the heating parts of said electric machine to and against said ribs.

11. The combination with an electric machine and a casing completely inclosing it, of means for throwing air from the central portion of the machine against the inner surface of said casing, a barrel surrounding the peripheral portion of the casing, end pieces secured to said barrel at a distance from said casing to form inclosing chambers, and a rotary air-circulator for conducting a cooling medium between the barrel and the casing and through said inclosing chambers.

12. The combination with an electric machine, an inner casing completely inclosing the same and an outer casing completely inclosing the inner casing, of a rotary device for circulating a cooling medium through the space between the two casings, and means for throwing air from the central portion of the machine against the inner surface of the inner casing.

In testimony whereof I have signed my name to this specification in the presence of two subscribing witnesses.

LEO FALK.

Witnesses:
 DAVID FALK,
 LEOPOLD FREI.